(12) United States Patent
Tang et al.

(10) Patent No.: US 12,285,737 B1
(45) Date of Patent: Apr. 29, 2025

(54) AMINE-SUPPORTED MESOPOROUS CARBON AND PREPARATION METHOD AND USE THEREOF

(71) Applicant: Zhejiang University, Hangzhou (CN)

(72) Inventors: Minghui Tang, Hangzhou (CN); Hongxian Li, Hangzhou (CN); Shengyong Lu, Hangzhou (CN); Qi Liu, Hangzhou (CN); Zhiyuan Gong, Hangzhou (CN); Jianhua Yan, Hangzhou (CN)

(73) Assignee: Zhejiang University, Hangzhou (CN)

( * ) Notice: Subject to any disclaimer, the term of this patent is extended or adjusted under 35 U.S.C. 154(b) by 0 days.

(21) Appl. No.: 18/963,457

(22) Filed: Nov. 27, 2024

(30) Foreign Application Priority Data

Dec. 1, 2023 (CN) .......................... 202311639625.8

(51) Int. Cl.
   *B01D 53/02*   (2006.01)
   *B01D 53/04*   (2006.01)
   (Continued)

(52) U.S. Cl.
   CPC .............. *B01J 20/20* (2013.01); *B01D 53/04* (2013.01); *B01J 20/3021* (2013.01);
   (Continued)

(58) Field of Classification Search
   CPC .... B01J 20/20; B01J 20/3021; B01J 20/3071; B01J 20/3078; B01J 20/3206;
   (Continued)

(56) References Cited

U.S. PATENT DOCUMENTS

2012/0222555 A1* 9/2012 Gupta ................ B01J 20/28057
                                                   502/79
2015/0321167 A1  11/2015 Wang et al.
2021/0260520 A1*  8/2021 Onaizi ............... B01D 53/0462

FOREIGN PATENT DOCUMENTS

CN          105817202 A        8/2016
CN          106276893 A        1/2017
              (Continued)

OTHER PUBLICATIONS

Translation of CN-108816180-A (Year: 2018).*
(Continued)

*Primary Examiner* — Christopher P Jones
(74) *Attorney, Agent, or Firm* — Bayramoglu Law Ofices LLC (57) ABSTRACT

Amine-supported mesoporous carbon and a preparation method and use thereof are provided. The preparation method includes: dissolving glucosamine hydrochloride completely in deionized water; adding aqueous colloidal silica dropwise under stirring for full dispersion; heating, stirring, and conducting evaporation to dryness; grinding to obtain a powder, adding the powder to a crucible, and conducting a hydrothermal reaction to obtain a black powder; oven-drying the black powder, and conducting carbonization in a muffle furnace in a protective gas environment to obtain a carbonized solid; adding the carbonized solid to an ammonium hydrogen fluoride solution to remove silica; repeatedly washing with deionized water, and drying in an oven to obtain nitrogen-doped mesoporous carbon (NC); adding the NC to an amine solution prepared with absolute ethanol, and stirring for full dispersion; and stirring a mixed solution in an oil bath until the absolute ethanol is completely evaporated to obtain the amine-supported mesoporous carbon.

7 Claims, 6 Drawing Sheets

(51) Int. Cl.
- *B01J 20/20* (2006.01)
- *B01J 20/30* (2006.01)
- *B01J 20/32* (2006.01)
- *B01J 20/34* (2006.01)

(52) U.S. Cl.
CPC ....... *B01J 20/3071* (2013.01); *B01J 20/3078* (2013.01); *B01J 20/3206* (2013.01); *B01J 20/324* (2013.01); *B01J 20/3416* (2013.01); *B01J 20/3458* (2013.01); *B01D 2253/102* (2013.01); *B01D 2253/25* (2013.01); *B01D 2257/504* (2013.01); *B01D 2259/4009* (2013.01)

(58) Field of Classification Search
CPC .. B01J 20/324; B01J 20/3416; B01J 20/3458; B01D 53/04; B01D 2253/102; B01D 2253/25; B01D 2257/504; B01D 2259/4009
See application file for complete search history.

(56) References Cited

FOREIGN PATENT DOCUMENTS

| | | | |
|---|---|---|---|
| CN | 106861618 A | | 6/2017 |
| CN | 108816180 A | * | 11/2018 |
| CN | 109201007 A | | 1/2019 |
| CN | 109759112 A | | 5/2019 |
| CN | 113952933 A | | 1/2022 |
| CN | 116371388 A | | 7/2023 |
| CN | 116832781 A | | 10/2023 |
| CN | 116850956 A | | 10/2023 |

OTHER PUBLICATIONS

Jingjie Wu, et al., Preparation and characterization of an amine-modified graphene aerogel for enhanced carbon dioxide adsorption, Journal of Materials Science, 2022, pp. 1727-1737, vol. 57 No. 3.

Riya Chatterjeea, et al. Ultrasound cavitation intensified amine functionalization: A feasible strategy for enhancing CO2 capture capacity of biochar, Fuel, 2018, pp. 287-298, vol. 225.

* cited by examiner

AMINE-SUPPORTED MESOPOROUS CARBON AND PREPARATION METHOD AND USE THEREOF

CROSS REFERENCE TO THE RELATED APPLICATIONS

This application is based upon and claims priority to Chinese Patent Application No. 202311639625.8, filed on Dec. 1, 2023, the entire contents of which are incorporated herein by reference.

TECHNICAL FIELD

The present disclosure relates to the technical field of adsorbent preparation, and specifically to amine-supported mesoporous carbon and a preparation method and use thereof.

BACKGROUND

The continuous increase in the concentration of carbon dioxide in the atmosphere is a major factor causing the global warming. According to the statistics of the International Energy Agency (IEA), the total emission of $CO_2$ globally reached a record high of 36.8 billion tons in 2022. The carbon emissions in the power industry account for 39.8% of the total carbon emissions, and thus the power industry is a major contributor to carbon emissions. The carbon emissions resulting from coal-fired power generation in 2022 increased by 1.6% compared with the carbon emissions resulting from coal-fired power generation in the previous year. Therefore, the reduction in the carbon emissions resulting from coal-fired power generation is of great significance for reducing the global $CO_2$ concentration. The liquid amine absorption method is currently the mainstream technology for carbon capture from coal-fired flue gases. The liquid amine absorption method is relatively mature but exhibits many shortcomings, such as easy amine loss, poor cycling stability, high cost, and high energy consumption. In contrast, the solid adsorption method is widely regarded as the second-generation carbon capture technology due to its various advantages, such as excellent cycling performance, low cost, and low energy consumption. However, the solid adsorption method has not yet been industrialized, and the large-scale implementation of the solid adsorption method has yet to be verified. One of the main research focuses on the solid adsorption method is the development of efficient solid adsorbents. When the solid adsorption method is used for carbon capture from flue gases, the corresponding adsorbents are further required to have excellent $CO_2$ adsorption performance at low concentrations.

The current solid adsorbents extensively studied include zeolite molecular sieves, metal-organic frameworks (MOFs), covalent organic frameworks (COFs), silicon-based materials, alkali carbonates, boron carbonitride materials, porous carbon-based materials, etc. The porous carbon materials are widely used in $CO_2$ adsorption due to numerous advantages such as low cost, widely available raw materials, large specific surface area, small influence by high humidity, prominent cycling performance, and easy modification. In view of the poor adsorption performance of pure porous carbon materials under low pressures, a variety of functionalized porous carbon materials have been developed, including heteroatom-doped carbon materials, metal-modified carbon materials, amine-functionalized carbon materials, etc. The amine-functionalized carbon materials combine the advantages of carbon materials and liquid amine, which can improve the cycling stability while greatly improving the adsorption performance under low pressures. Thus, the amine-functionalized carbon materials are promising adsorbents for $CO_2$ capture from flue gases. The amine functionalization can include the two categories of amine grafting and amine loading. The amine grafting mainly refers to the combination of an organic amine, such as 3-aminopropyltriethoxysilane (APTES), with an active group on a surface of a carrier through a condensation reaction, etc., which allows for strong stability. However, the amine grafting generally involves a complicated preparation process, the types of amine molecules that can be grafted are limited, and the amine grafting leads to poor adsorption performance. In contrast, the amine loading involves a simple preparation process, is suitable for almost all types of amine molecules, and leads to excellent adsorption performance. Wu et al. [1] have prepared a tetraethylenepentamine (TEPA)-supported graphene aerogel for $CO_2$ adsorption through impregnation. An adsorption capacity of the TEPA-supported graphene aerogel at 25° C. and 0.1 bar is 2.27 mmol/g, and the adsorption capacity decreases by 8.4% after 6 cycles, indicating that both the adsorption capacity and the cycling performance are relatively limited. Chatterjee et al. [2] have prepared an amine-supported biochar through an ultrasonic treatment. An adsorption capacity of the amine-supported biochar at 70° C. and 0.15 bar reaches 2.79 mmol/g, but the adsorption capacity decreases by 44% after 15 cycles. It can be seen from the above that the current amine-supported carbon materials cannot have both a high adsorption capacity and excellent regeneration performance. Therefore, it is very important to prepare an amine-supported carbon material with both excellent $CO_2$ adsorption performance and excellent regeneration performance for industrial applications.

[1] Wu J, Qiu X, Chen S. Preparation and Characterization of an Amine-Modified Graphene Aerogel for Enhanced Carbon Dioxide Adsorption [J]. Journal of Materials Science, 2022, 57 (3): 1727-1737.

[2] Chatterjee R, Sajjadi B, Mattern D L, et al. Ultrasound Cavitation Intensified Amine Functionalization: A Feasible Strategy for Enhancing $CO_2$ Capture Capacity of Biochar [J]. Fuel, 2018, 225:287-298.

SUMMARY

In order to solve at least one of the problems for the amine-supported carbon materials in the prior art, the present disclosure provides amine-supported mesoporous carbon and a preparation method and use thereof.

To achieve the above objective, the present disclosure provides the following technical solutions:

A first aspect of the present disclosure provides a preparation method of amine-supported mesoporous carbon, comprising the following steps:

S1, dissolving glucosamine hydrochloride completely in deionized water;

S2, adding aqueous colloidal silica dropwise to a solution obtained in the S1 under stirring, and allowing full dispersion; and heating and stirring a mixed solution, and conducting evaporation to dryness to obtain a brown solid;

S3, grinding the brown solid into a powder, adding the powder to a crucible, placing the crucible in a hydrothermal reactor, and conducting a hydrothermal reaction;

S4, oven-drying a black powder produced after the hydrothermal reaction, and conducting carbonization in a muffle furnace in a protective gas environment;

S5, adding a carbonized solid obtained in the S4 to an ammonium hydrogen fluoride solution, and continuously stirring to remove silica; and repeatedly washing with deionized water until a resulting solution is neutral, and drying in an oven to obtain nitrogen-doped mesoporous carbon (NC);

S6, adding the NC obtained in the S5 to an amine solution prepared with absolute ethanol, and continuously stirring to allow full dispersion; and S7, stirring a mixed solution in an oil bath until the absolute ethanol is completely evaporated to obtain the amine-supported mesoporous carbon.

In some embodiments of the present disclosure, before the S6, the NC obtained in the S5 is pre-oxidized as follows: stirring in nitric acid with a concentration of 8 mol/L to 12 mol/L at room temperature for 10 h to 20 h, conducting washing and suction filtration until neutral, and oven-drying to obtain oxidized nitrogen-doped mesoporous carbon (ONC). Preferably, the stirring is conducted in nitric acid with a concentration of 10 mol/L at room temperature for 12 h.

In some embodiments of the present disclosure, in the S6, an amine is one of triethylenetetramine (TETA), TEPA, pentaethylenehexamine (PEHA), and polyethyleneimine (PEI), and a concentration of the amine solution is 5 g/L to 25 g/L. Preferably, the amine is one of TETA, TEPA, and PEHA. Most preferably, the amine is TEPA.

In some embodiments of the present disclosure, the hydrothermal reaction in the S3 is conducted at 150° C. to 200° C. for 20 h to 30 h. Preferably, the hydrothermal reaction is conducted at 180° C. for 24 h.

In some embodiments of the present disclosure, the protective gas environment in the S4 is as follows: a protective gas is nitrogen, a flow rate is 80 mL/min to 120 mL/min, and a heating rate is 8° C./min to 15° C./min. Preferably, the nitrogen flow rate is 100 mL/min, and the heating rate is 10° C./min.

In some embodiments of the present disclosure, the carbonization in the S4 is conducted under the following conditions: a temperature of 800° C. to 1,200° C., and a heat preservation time of 45 min to 90 min. Preferably, the carbonization temperature is 1,000° C., and the heat preservation time is 60 min.

In some embodiments of the present disclosure, a concentration of the ammonium hydrogen fluoride solution in the S5 is 0.2 g/mL to 0.5 g/mL.

A second aspect of the present disclosure provides amine-supported mesoporous carbon prepared by the preparation method described in the first aspect.

A third aspect of the present disclosure provides a use of the amine-supported mesoporous carbon described in the second aspect in $CO_2$ adsorption. In some use embodiments of the present disclosure, the $CO_2$ adsorption is conducted as follows: introducing a feed gas including a $CO_2$ gas into a fixed bed carrying the amine-supported mesoporous carbon, and conducting adsorption at 60° C. to 90° C. Preferably, the adsorption is conducted at 85° C.

In some use embodiments of the present disclosure, the use further includes the following regeneration treatment: heating spent amine-supported mesoporous carbon generated after the adsorption in a pure nitrogen environment for regeneration, where the regeneration is conducted at 105° C. to 125° C. and preferably 115° C.

Beneficial Effects of the Present Disclosure

Compared with the prior art, the present disclosure has the following beneficial effects: In the present disclosure, a NC material is prepared with glucosamine hydrochloride as a carbon source and silica as a template agent, and then, an amine-supported mesoporous carbon material is prepared through wet impregnation with the NC material as a carrier. Compared with unloaded NC, the amine-supported mesoporous carbon material is greatly improved in terms of $CO_2$ adsorption performance. After pre-oxidized mesoporous carbon is loaded with 50% of TEPA (50% TEPA-ONC), there is prominent $CO_2$ adsorption performance due to a large number of hydroxyl and amino sites on a surface and a relatively-complete pore structure of mesoporous carbon. The 50% TEPA-ONC can reach a saturated adsorption capacity of 90% or more within 5 min, and has a high adsorption rate. A $CO_2$ adsorption capacity at 0.15 bar and 85° C. is as high as 2.73 mmol/g, which is 17 times an adsorption capacity of a pure mesoporous carbon material under the same conditions. In addition, the above adsorption capacity is higher than most of the studies published currently.

The amine-supported mesoporous carbon material also exhibits excellent regeneration performance in a desorption experiment. A surface of the 50% TEPA-ONC includes a large amount of both hydroxyl and a nitrogen-doping component, which greatly improves the binding stability between mesoporous carbon and TEPA and leads to excellent regeneration performance. The adsorption capacity of the 50% TEPA-ONC decreases only by 2.9% after five cycles, indicating better regeneration performance than most of the published studies. An adsorption capacity of the 50% TETA-NC during the second cycle decreases by 17.2% compared with an adsorption capacity during the first cycle. There is a difference of only 1.2% between adsorption capacities of PEI-supported mesoporous carbon during the first (1.71 mmol/g) and second (1.69 mmol/g) cycles. Mass losses of TETA, TEPA, PEHA, and PEI-supported mesoporous carbon are 3.2%, 2.2%, 1.2%, and 0.5%, respectively, indicating the same trend as the cycling performance.

The preparation method of the present disclosure is simple. The prepared amine-supported mesoporous carbon has excellent $CO_2$ adsorption performance at 15% $CO_2$/85% $N_2$ and 85° C. The above conditions are just the conditions under which $CO_2$ in flue gases is located, and can give full play to a use value of the amine-supported mesoporous carbon in the capture of $CO_2$ from flue gases. Due to excellent regeneration performance, the amine-supported mesoporous carbon can be recycled.

DETAILED DESCRIPTION OF THE EMBODIMENTS

The following examples are used herein to demonstrate preferred embodiments of the present disclosure. It should be appreciated by those skilled in the art that the techniques disclosed in the following examples represent the techniques discovered by the inventors to implement the present disclosure, and thus can be considered as preferred solutions to implement the present disclosure. However, those skilled in the art should understand from the specification that many modifications can be made to the specific examples disclosed herein, and the same or similar results can still be obtained without departing from the spirit or scope of the present disclosure. Those skilled in the art will recognize, or can ascertain through routine tests, many equivalents to the specific embodiments of the present disclosure described herein. Such equivalents are to be covered by the claims.

Example 1

8 g of glucosamine hydrochloride was weighed and added to a beaker, then 40 mL of deionized water was added to the beaker, and stirring was conducted for complete dissolution. Then, 8 g of LUDOX® HS-40 colloidal silica was added dropwise under stirring to ensure that the colloidal silica was fully dispersed in a solution. A mixed solution was stirred at 80° C. until water was completely evaporated to obtain a brown solid. The brown solid was ground into a powder, the powder was added to a 30 mL crucible, and the crucible was placed in a 200 mL hydrothermal reactor. 20 mL of deionized water was added to the hydrothermal reactor, then the hydrothermal reactor was sealed, and a hydrothermal reaction was conducted at 180° C. for 24 h. A black powder produced after the hydrothermal reaction was oven-dried at 70° C. and then carbonized in a muffle furnace. The carbonization was conducted under the following conditions: nitrogen was adopted as a protective gas, a flow rate of the nitrogen was 100 mL/min, a heating rate was 10° C./min, a carbonization temperature was 1,000° C., and a heat preservation time was 1 h.

60 g of ammonium hydrogen fluoride was added to 240 mL of water to prepare a silica template-removing solution. A carbonized black powder was added to the silica template-removing solution, and stirring was conducted for 48 h to completely remove the silica. A template-removed carbon material was washed with deionized water multiple times until a resulting washing solution was neutral, and then dried in an oven at 105° C. for 12 h to obtain NC.

1 g of TEPA was fully dissolved in 100 mL of absolute ethanol, then 1 g of the NC was added, and stirring was conducted for 1 h to allow full dispersion. A mixed solution was stirred in a 70° C. oil bath until the absolute ethanol was completely evaporated to obtain 50% TEPA-NC.

Example 2

8 g of glucosamine hydrochloride was weighed and added to a beaker, then 40 mL of deionized water was added to the beaker, and stirring was conducted for complete dissolution. Then, 8 g of LUDOX® HS-40 colloidal silica was added dropwise under stirring to ensure that the colloidal silica was fully dispersed in a solution. A mixed solution was stirred at 80° C. until water was completely evaporated to obtain a brown solid. The brown solid was ground into a powder, the powder was added to a 30 mL crucible, and the crucible was placed in a 200 mL hydrothermal reactor. 20 mL of deionized water was added to the hydrothermal reactor, then the hydrothermal reactor was sealed, and a hydrothermal reaction was conducted at 180° C. for 24 h. A black powder produced after the hydrothermal reaction was oven-dried at 70° C. and then carbonized in a muffle furnace. The carbonization was conducted under the following conditions: nitrogen was adopted as a protective gas, a flow rate of the nitrogen was 100 mL/min, a heating rate was 10° C./min, a carbonization temperature was 1,000° C., and a heat preservation time was 1 h.

60 g of ammonium hydrogen fluoride was added to 240 mL of water to prepare a silica template-removing solution. A carbonized black powder was added to the silica template-removing solution, and stirring was conducted for 48 h to completely remove the silica. A template-removed carbon material was washed with deionized water multiple times until a resulting washing solution was neutral, and then dried in an oven at 105° C. for 12 h to obtain NC.

1 g of the NC was added to 60 mL of $HNO_3$ at a concentration of 10 mol/L, and stirring was conducted for 12 h at room temperature. Then washing and suction filtration were conducted until neutral, and oven-drying was conducted at 105° C. to obtain ONC.

0.5 g of TEPA was fully dissolved in 100 mL of absolute ethanol, then 0.5 g of the ONC was added, and stirring was conducted for 1 h to allow full dispersion. A mixed solution was stirred in a 70° C. oil bath until the absolute ethanol was completely evaporated to obtain 50% TEPA-ONC.

Example 3

8 g of glucosamine hydrochloride was weighed and added to a beaker, then 40 mL of deionized water was added to the beaker, and stirring was conducted for complete dissolution. Then, 8 g of LUDOX® HS-40 colloidal silica was added dropwise under stirring to ensure that the colloidal silica was fully dispersed in a solution. A mixed solution was stirred at 80° C. until water was completely evaporated to obtain a brown solid. The brown solid was ground into a powder, the powder was added to a 30 mL crucible, and the crucible was placed in a 200 mL hydrothermal reactor. 20 mL of deionized water was added to the hydrothermal reactor, then the hydrothermal reactor was sealed, and a hydrothermal reaction was conducted at 180° C. for 24 h. A black powder produced after the hydrothermal reaction was oven-dried at 70° C. and then carbonized in a muffle furnace. The carbonization was conducted under the following conditions: nitrogen was adopted as a protective gas, a flow rate of the nitrogen was 100 mL/min, a heating rate was 10° C./min, a carbonization temperature was 1,000° C., and a heat preservation time was 1 h.

60 g of ammonium hydrogen fluoride was added to 240 mL of water to prepare a silica template-removing solution. A carbonized black powder was added to the silica template-removing solution, and stirring was conducted for 48 h to completely remove the silica. A template-removed carbon material was washed with deionized water multiple times until a resulting washing solution was neutral, and then dried in an oven at 105° C. for 12 h to obtain NC.

0.43 g of TEPA was fully dissolved in 100 mL of absolute ethanol, then 1 g of the NC was added, and stirring was conducted for 1 h to allow full dispersion. A mixed solution was stirred in a 70° C. oil bath until the absolute ethanol was completely evaporated to obtain 30% TEPA-NC.

Example 4

8 g of glucosamine hydrochloride was weighed and added to a beaker, then 40 mL of deionized water was added to the beaker, and stirring was conducted for complete dissolution. Then, 8 g of LUDOX® HS-40 colloidal silica was added dropwise under stirring to ensure that the colloidal silica was fully dispersed in a solution. A mixed solution was stirred at 80° C. until water was completely evaporated to obtain a brown solid. The brown solid was ground into a powder, the powder was added to a 30 mL crucible, and the crucible was placed in a 200 mL hydrothermal reactor. 20 mL of deionized water was added to the hydrothermal reactor, then the hydrothermal reactor was sealed, and a hydrothermal reaction was conducted at 180° C. for 24 h. A black powder produced after the hydrothermal reaction was oven-dried at 70° C. and then carbonized in a muffle furnace. The carbonization was conducted under the following conditions: nitrogen was adopted as a protective gas, a flow rate of the nitrogen was 100 mL/min, a heating rate was 10° C./min, a carbonization temperature was 1,000° C., and a heat preservation time was 1 h.

60 g of ammonium hydrogen fluoride was added to 240 mL of water to prepare a silica template-removing solution. A carbonized black powder was added to the silica template-removing solution, and stirring was conducted for 48 h to completely remove the silica. A template-removed carbon material was washed with deionized water multiple times until a resulting washing solution was neutral, and then dried in an oven at 105° C. for 12 h to obtain NC.

2.33 g of TEPA was fully dissolved in 100 mL of absolute ethanol, then 1 g of the NC was added, and stirring was conducted for 1 h to allow full dispersion. A mixed solution was stirred in a 70° C. oil bath until the absolute ethanol was completely evaporated to obtain 70% TEPA-NC.

Example 5

8 g of glucosamine hydrochloride was weighed and added to a beaker, then 40 mL of deionized water was added to the beaker, and stirring was conducted for complete dissolution. Then, 8 g of LUDOX® HS-40 colloidal silica was added dropwise under stirring to ensure that the colloidal silica was fully dispersed in a solution. A mixed solution was stirred at 80° C. until water was completely evaporated to obtain a brown solid. The brown solid was ground into a powder, the powder was added to a 30 mL crucible, and the crucible was placed in a 200 mL hydrothermal reactor. 20 mL of deionized water was added to the hydrothermal reactor, then the hydrothermal reactor was sealed, and a hydrothermal reaction was conducted at 180° C. for 24 h. A black powder produced after the hydrothermal reaction was oven-dried at 70° C. and then carbonized in a muffle furnace. The carbonization was conducted under the following conditions: nitrogen was adopted as a protective gas, a flow rate of the nitrogen was 100 mL/min, a heating rate was 10° C./min, a carbonization temperature was 1,000° C., and a heat preservation time was 1 h.

60 g of ammonium hydrogen fluoride was added to 240 mL of water to prepare a silica template-removing solution. A carbonized black powder was added to the silica template-removing solution, and stirring was conducted for 48 h to completely remove the silica. A template-removed carbon material was washed with deionized water multiple times until a resulting washing solution was neutral, and then dried in an oven at 105° C. for 12 h to obtain NC.

1 g of TETA was fully dissolved in 100 mL of absolute ethanol, then 1 g of the NC was added, and stirring was conducted for 1 h to allow full dispersion. A mixed solution was stirred in a 70° C. oil bath until the absolute ethanol was completely evaporated to obtain 50% TETA-NC.

Example 6

8 g of glucosamine hydrochloride was weighed and added to a beaker, then 40 mL of deionized water was added to the beaker, and stirring was conducted for complete dissolution. Then, 8 g of LUDOX® HS-40 colloidal silica was added dropwise under stirring to ensure that the colloidal silica was fully dispersed in a solution. A mixed solution was stirred at 80° C. until water was completely evaporated to obtain a brown solid. The brown solid was ground into a powder, the powder was added to a 30 mL crucible, and the crucible was placed in a 200 mL hydrothermal reactor. 20 mL of deionized water was added to the hydrothermal reactor, then the hydrothermal reactor was sealed, and a hydrothermal reaction was conducted at 180° C. for 24 h. A black powder produced after the hydrothermal reaction was oven-dried at 70° C. and then carbonized in a muffle furnace. The carbonization was conducted under the following conditions: nitrogen was adopted as a protective gas, a flow rate of the nitrogen was 100 mL/min, a heating rate was 10° C./min, a carbonization temperature was 1,000° C., and a heat preservation time was 1 h.

60 g of ammonium hydrogen fluoride was added to 240 mL of water to prepare a silica template-removing solution. A carbonized black powder was added to the silica template-removing solution, and stirring was conducted for 48 h to completely remove the silica. A template-removed carbon material was washed with deionized water multiple times until a resulting washing solution was neutral, and then dried in an oven at 105° C. for 12 h to obtain NC.

1 g of PEHA was fully dissolved in 100 mL of absolute ethanol, then 1 g of the NC was added, and stirring was conducted for 1 h to allow full dispersion. A mixed solution was stirred in a 70° C. oil bath until the absolute ethanol was completely evaporated to obtain 50% PEHA-NC.

Example 7

8 g of glucosamine hydrochloride was weighed and added to a beaker, then 40 mL of deionized water was added to the beaker, and stirring was conducted for complete dissolution. Then, 8 g of LUDOX® HS-40 colloidal silica was added dropwise under stirring to ensure that the colloidal silica was fully dispersed in a solution. A mixed solution was stirred at 80° C. until water was completely evaporated to obtain a brown solid. The brown solid was ground into a powder, the powder was added to a 30 mL crucible, and the crucible was placed in a 200 mL hydrothermal reactor. 20 mL of deionized water was added to the hydrothermal reactor, then the hydrothermal reactor was sealed, and a hydrothermal reaction was conducted at 180° C. for 24 h. A black powder produced after the hydrothermal reaction was oven-dried at 70° C. and then carbonized in a muffle furnace. The carbonization was conducted under the following conditions: nitrogen was adopted as a protective gas, a flow rate of the nitrogen was 100 mL/min, a heating rate was 10° C./min, a carbonization temperature was 1,000° C., and a heat preservation time was 1 h.

60 g of ammonium hydrogen fluoride was added to 240 mL of water to prepare a silica template-removing solution. A carbonized black powder was added to the silica template-removing solution, and stirring was conducted for 48 h to completely remove the silica. A template-removed carbon material was washed with deionized water multiple times until a resulting washing solution was neutral, and then dried in an oven at 105° C. for 12 h to obtain NC.

1 g of PEI was fully dissolved in 100 mL of absolute ethanol, then 1 g of the NC was added, and stirring was conducted for 1 h to allow full dispersion. A mixed solution was stirred in a 70° C. oil bath until the absolute ethanol was completely evaporated to obtain 50% PEI-NC.

Example 8

8 g of glucosamine hydrochloride was weighed and added to a beaker, then 40 mL of deionized water was added to the beaker, and stirring was conducted for complete dissolution. Then, 8 g of LUDOX® HS-40 colloidal silica was added dropwise under stirring to ensure that the colloidal silica was fully dispersed in a solution. A mixed solution was stirred at 80° C. until water was completely evaporated to obtain a brown solid. The brown solid was ground into a powder, the powder was added to a 30 mL crucible, and the crucible was placed in a 200 mL hydrothermal reactor. 20 mL of deionized water was added to the hydrothermal reactor, then the hydrothermal reactor was sealed, and a hydrothermal reaction was conducted at 180° C. for 24 h. A black powder produced after the hydrothermal reaction was oven-dried at 70° C. and then carbonized in a muffle furnace. The carbonization was conducted under the following conditions: nitrogen was adopted as a protective gas, a flow rate of the nitrogen was 100 mL/min, a heating rate was 10° C./min, a carbonization temperature was 1,000° C., and a heat preservation time was 1 h.

60 g of ammonium hydrogen fluoride was added to 240 mL of water to prepare a silica template-removing solution. A carbonized black powder was added to the silica template-removing solution, and stirring was conducted for 48 h to completely remove the silica. A template-removed carbon material was washed with deionized water multiple times until a resulting washing solution was neutral, and then dried in an oven at 105° C. for 12 h to obtain NC.

0.67 g of TEPA was fully dissolved in 100 mL of absolute ethanol, then 1 g of the NC was added, and stirring was conducted for 1 h to allow full dispersion. A mixed solution was stirred in a 70° C. oil bath until the absolute ethanol was completely evaporated to obtain 40% TEPA-NC.

Example 9

8 g of glucosamine hydrochloride was weighed and added to a beaker, then 40 mL of deionized water was added to the beaker, and stirring was conducted for complete dissolution. Then, 8 g of LUDOX® HS-40 colloidal silica was added dropwise under stirring to ensure that the colloidal silica was fully dispersed in a solution. A mixed solution was stirred at 80° C. until water was completely evaporated to obtain a brown solid. The brown solid was ground into a powder, the powder was added to a 30 mL crucible, and the crucible was placed in a 200 mL hydrothermal reactor. 20 mL of deionized water was added to the hydrothermal reactor, then the hydrothermal reactor was sealed, and a hydrothermal reaction was conducted at 180° C. for 24 h. A black powder produced after the hydrothermal reaction was oven-dried at 70° C. and then carbonized in a muffle furnace. The carbonization was conducted under the following conditions: nitrogen was adopted as a protective gas, a flow rate of the nitrogen was 100 mL/min, a heating rate was 10° C./min, a carbonization temperature was 1,000° C., and a heat preservation time was 1 h.

60 g of ammonium hydrogen fluoride was added to 240 mL of water to prepare a silica template-removing solution. A carbonized black powder was added to the silica template-removing solution, and stirring was conducted for 48 h to completely remove the silica. A template-removed carbon material was washed with deionized water multiple times until a resulting washing solution was neutral, and then dried in an oven at 105° C. for 12 h to obtain NC.

1.5 g of TEPA was fully dissolved in 100 mL of absolute ethanol, then 1 g of the NC was added, and stirring was conducted for 1 h to allow full dispersion. A mixed solution was stirred in a 70° C. oil bath until the absolute ethanol was completely evaporated to obtain 60% TEPA-NC.

Comparative Example 1

8 g of glucosamine hydrochloride was weighed and added to a beaker, then 40 mL of deionized water was added to the beaker, and stirring was conducted for complete dissolution. Then, 8 g of LUDOX® HS-40 colloidal silica was added dropwise under stirring to ensure that the colloidal silica was fully dispersed in a solution. A mixed solution was stirred at 80° C. until water was completely evaporated to obtain a brown solid. The brown solid was ground into a powder, the powder was added to a 30 mL crucible, and the crucible was placed in a 200 mL hydrothermal reactor. 20 mL of deionized water was added to the hydrothermal reactor, then the hydrothermal reactor was sealed, and a hydrothermal reaction was conducted at 180° C. for 24 h. A black powder produced after the hydrothermal reaction was oven-dried at 70° C. and then carbonized in a muffle furnace. The carbonization was conducted under the following conditions: nitrogen was adopted as a protective gas, a flow rate of the nitrogen was 100 mL/min, a heating rate was 10° C./min, a carbonization temperature was 1,000° C., and a heat preservation time was 1 h.

60 g of ammonium hydrogen fluoride was added to 240 mL of water to prepare a silica template-removing solution. A carbonized black powder was added to the silica template-removing solution, and stirring was conducted for 48 h to completely remove the silica. A template-removed carbon material was washed with deionized water multiple times until a resulting washing solution was neutral, and then dried in an oven at 105° C. for 12 h to obtain NC.

Comparative Example 2

8 g of glucosamine hydrochloride was weighed and added to a beaker, then 40 mL of deionized water was added to the beaker, and stirring was conducted for complete dissolution. Then, 8 g of LUDOX® HS-40 colloidal silica was added dropwise under stirring to ensure that the colloidal silica was fully dispersed in a solution. A mixed solution was stirred at 80° C. until water was completely evaporated to obtain a brown solid. The brown solid was ground into a powder, the powder was added to a 30 mL crucible, and the crucible was placed in a 200 mL hydrothermal reactor. 20 mL of deionized water was added to the hydrothermal reactor, then the hydrothermal reactor was sealed, and a hydrothermal reaction was conducted at 180° C. for 24 h. A black powder produced after the hydrothermal reaction was oven-dried at 70° C. and then carbonized in a muffle furnace. The carbonization was conducted under the following conditions: nitrogen was adopted as a protective gas, a flow rate of the nitrogen was 100 mL/min, a heating rate was 10° C./min, a carbonization temperature was 1,000° C., and a heat preservation time was 1 h.

60 g of ammonium hydrogen fluoride was added to 240 mL of water to prepare a silica template-removing solution. A carbonized black powder was added to the silica template-removing solution, and stirring was conducted for 48 h to completely remove the silica. A template-removed carbon material was washed with deionized water multiple times until a resulting washing solution was neutral, and then dried in an oven at 105° C. for 12 h to obtain NC.

1 g of the NC was added to 60 mL of $HNO_3$ at a concentration of 10 mol/L, and stirring was conducted for 12 h at room temperature. Then washing and suction filtration were conducted until neutral, and oven-drying was conducted at 105° C. to obtain ONC.

The carbon materials prepared in Examples 1 to 7 and Comparative Examples 1 and 2 each were subjected to performance characterization and testing.

Figure 2:
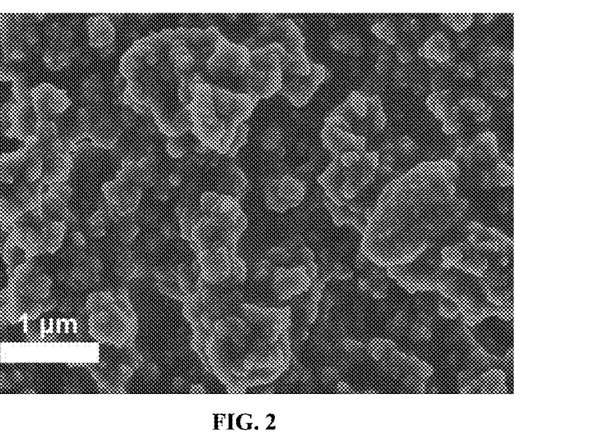
FIG. 2 is an SEM image of the 70% TEPA-NC prepared in Example 4 of the present disclosure.
Figure 3:
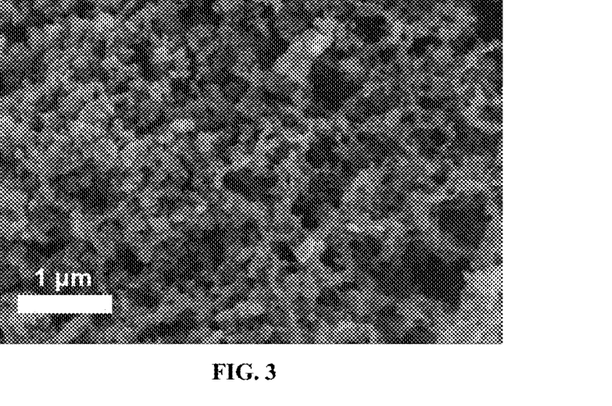
FIG. 3 is an SEM image of the NC prepared in Comparative Example 1 of the present disclosure.

(1) SEM was conducted for the materials prepared in Examples 1 and 4 and Comparative Example 1. Resulting SEM images are shown in FIG. 1 to FIG. 3, respectively.

Figure 1:
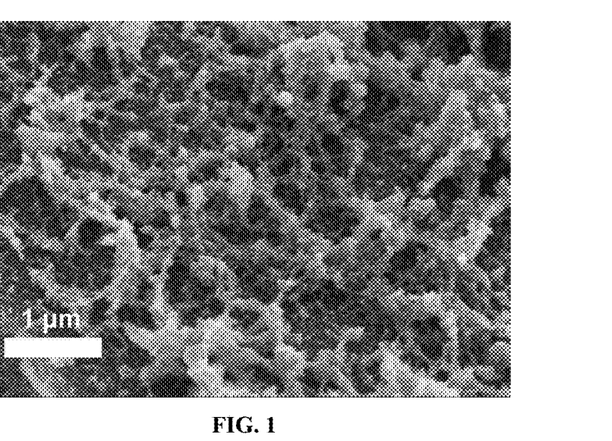
FIG. 1 is a scanning electron microscopy (SEM) image of the 50% TEPA-NC prepared in Example 1 of the present disclosure.

It can be seen from FIG. 1 that the mesoporous carbon material loaded with 50% of TEPA still has many pore structures. Compared with the pure mesoporous carbon material without an amine in FIG. 3, in the mesoporous carbon material loaded with 50% of TEPA, pore structures are not obviously blocked, and some amino functional groups are added to a surface. It is inferred that the mesoporous carbon material loaded with 50% of TEPA has excellent $CO_2$ adsorption performance. It can be seen from FIG. 2 that, when a load is as high as 70%, pore structures of the material are basically all blocked by the amine, and the original morphology of mesoporous carbon is basically lost. It can be inferred that the $CO_2$ adsorption performance of the material is negatively affected in this case.

(2) The carbon materials prepared in Examples 1 to 4 and Comparative Examples 1 and 2 each were subjected to XPS testing. Resulting O1s and N1s spectra are shown in FIG. 4 and FIG. 5, respectively.

Figure 4:
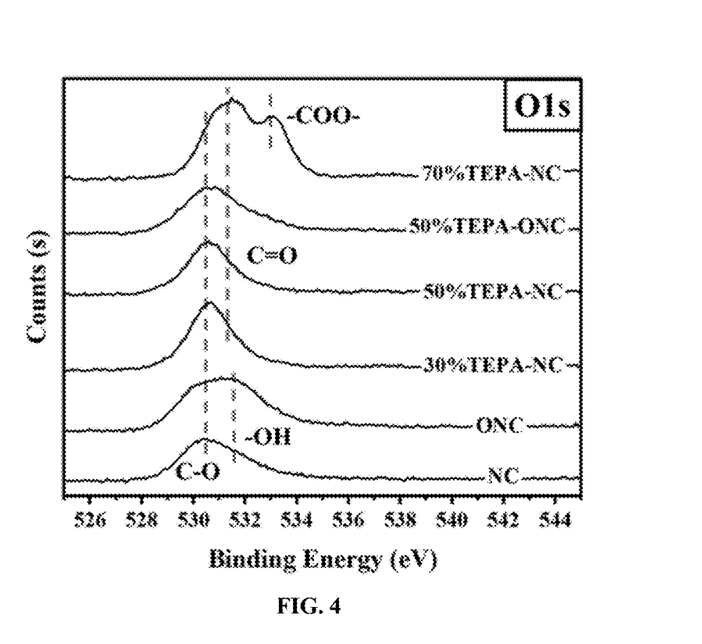
FIG. 4 shows O1s spectra of X-ray photoelectron spectroscopy (XPS) for the materials prepared in Examples 1 to 4 and Comparative Examples 1 and 2 of the present disclosure.
Figure 5:
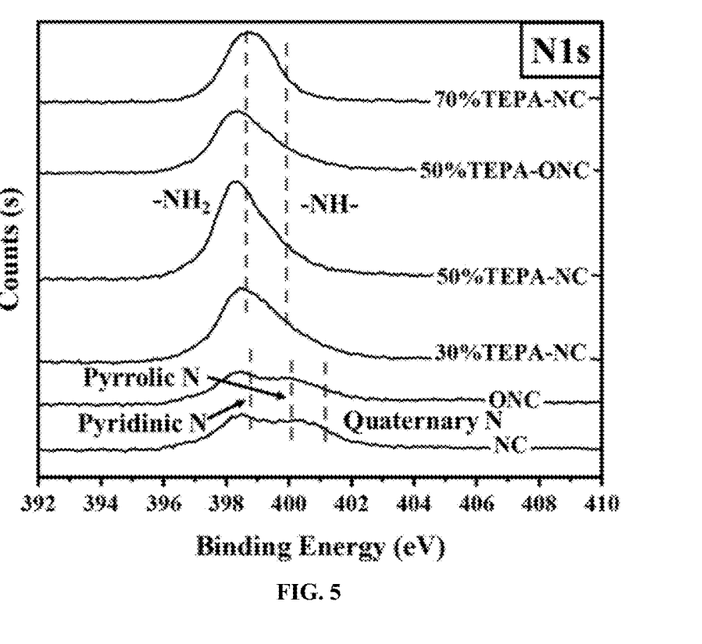
FIG. 5 shows N1s spectra of XPS for the materials prepared in Examples 1 to 4 and Comparative Examples 1 and 2 of the present disclosure.

It can be seen from FIG. 4 that a number of hydroxyl groups in the ONC is significantly increased compared with the pure NC. In the ONC loaded with 50% of TEPA, obvious hydroxyl groups can still be observed. It can be seen from FIG. 5 that nitrogen is doped on a surface of a mesoporous carbon material without an amine mainly in the forms of pyridine nitrogen, pyrrole nitrogen, and graphite nitrogen, and after the amine loading, nitrogen is doped in the forms of primary amino groups and secondary amino groups in amine molecules, indicating the successful loading of amine molecules on the surface.

(3) The carbon materials prepared in Examples 1 to 7 and Comparative Examples 1 and 2 each were subjected to a $CO_2$ adsorption test at different temperatures as follows: A feed gas including a $CO_2$ gas was introduced into a fixed bed carrying the above amine-supported mesoporous carbon, and the adsorption was tested at 60° C. to 90° C. Resulting adsorption capacities are shown in FIG. 6 to FIG. 10.

Figure 6:
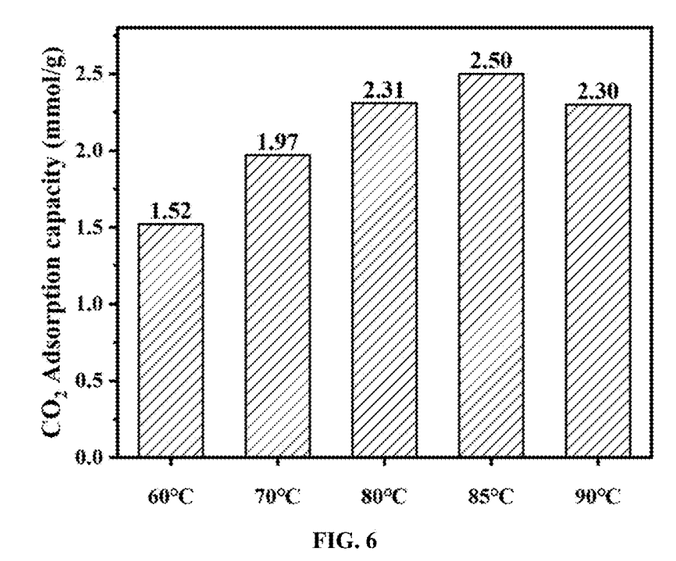
FIG. 6 is a comparison diagram of $CO_2$ adsorption capacities of the material prepared in Example 1 of the present disclosure at different adsorption temperatures.

FIG. 6 shows the $CO_2$ adsorption capacities of the 50% TEPA-NC prepared in Example 1 at different adsorption temperatures. It can be seen from FIG. 6 that the material can capture $CO_2$ from a mixed gas of 15% $CO_2$/85% $N_2$ at 60° C. to 90° C. A range of 80° C. to 90° C. is an appropriate temperature range, and 85° C. is the optimal adsorption temperature.

Figure 7:
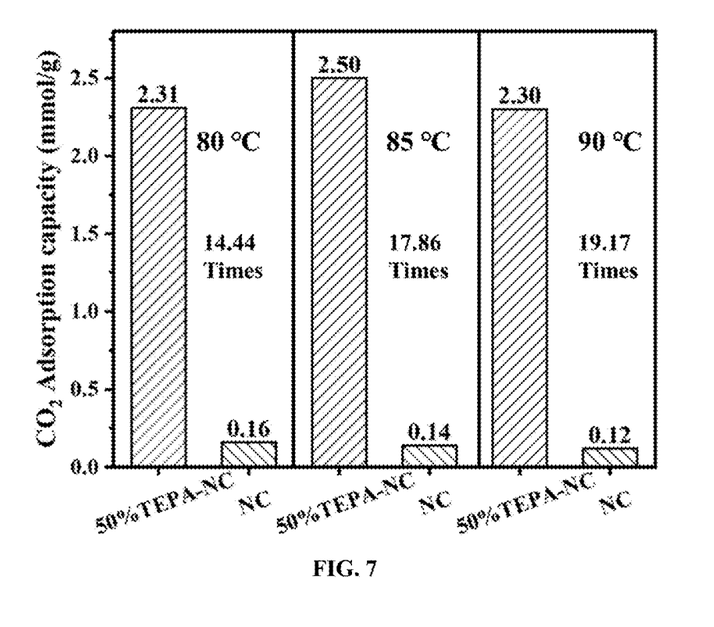
FIG. 7 is a comparison diagram of $CO_2$ adsorption capacities of the materials prepared in Example 1 and Comparative Example 1 of the present disclosure at different adsorption temperatures.

FIG. 7 shows the comparison of $CO_2$ adsorption capacities of the materials prepared in Example 1 and Comparative Example 1 at different temperatures. According to this figure: An adsorption capacity of mesoporous carbon is greatly improved after the amine loading. An adsorption capacity of the amine-loaded mesoporous carbon at 90° C. is as high as 2.30 mmol/g, which is 19.17 times the adsorption capacity of the pure mesoporous carbon. With the increase of an adsorption temperature, the improvement of the amine loading for the adsorption capacity increases from 14.44 times at 80° C. to 19.17 times at 90° C.

Figure 8:
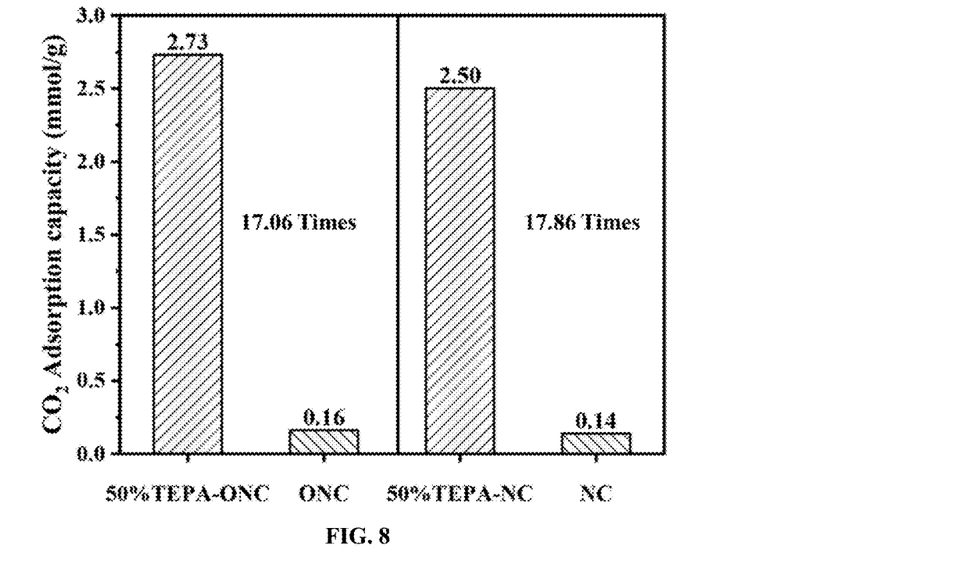
FIG. 8 is a comparison diagram of $CO_2$ adsorption capacities of the materials prepared in Examples 1 and 2 and Comparative Examples 1 and 2 of the present disclosure at 85° C.

FIG. 8 shows the comparison of $CO_2$ adsorption capacities of the materials prepared in Examples 1 and 2 and Comparative Examples 1 and 2 at 85° C. It can be seen from this figure that the amine loading for either ONC or NC as a carrier can greatly improve a $CO_2$ adsorption capacity of the mesoporous carbon, and adsorption capacities of both amine-supported ONC and NC are basically 17 times an adsorption capacity of the pure mesoporous carbon.

Figure 9:
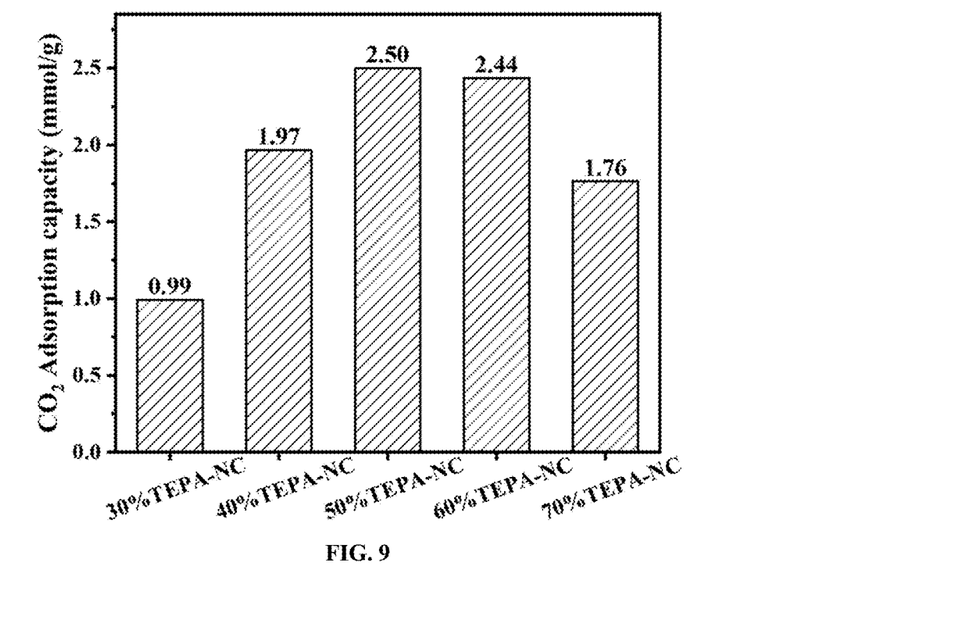
FIG. 9 is a comparison diagram of $CO_2$ adsorption capacities of the materials prepared in Examples 1, 3, 4, 8, and 9 of the present disclosure at 85° C.

FIG. 9 shows the $CO_2$ adsorption capacities of the materials prepared in Examples 1, 3, 4, 8, and 9 at 85° C. It can be seen from this figure that a load of 50% is the optimal load ratio, and a load ratio higher than or lower than the optimal load ratio will lead to the decline of adsorption performance. The load ratio lower than the optimal load ratio will lead to the decline of adsorption performance because there are few adsorption sites, and the load ratio higher than the optimal load ratio will lead to the decline of adsorption performance because the pore structures of mesoporous carbon are blocked by a large number of amine molecules, which can also be confirmed by the SEM image in FIG. 3.

Figure 10:
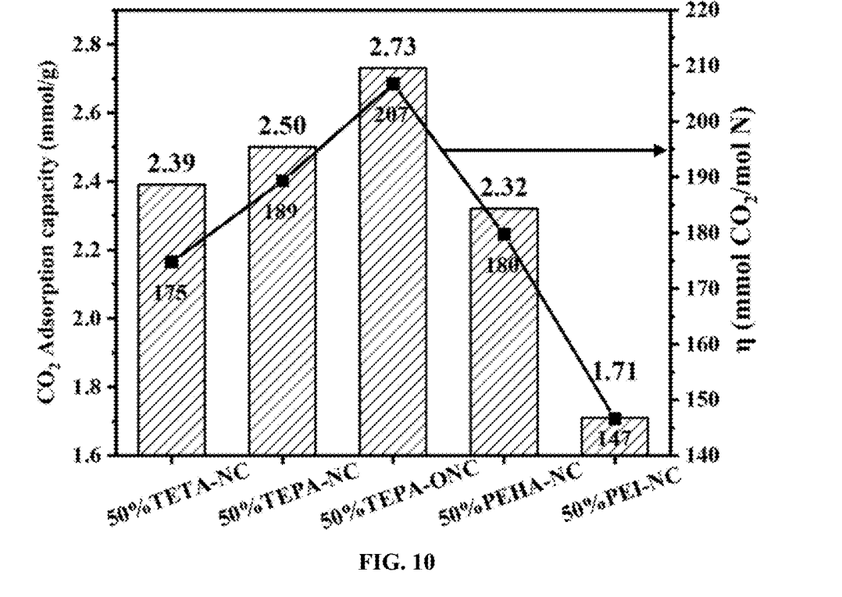
FIG. 10 is a comparison diagram of $CO_2$ adsorption capacities and amine utilization efficiencies of the materials prepared in Examples 1, 2, and 5 to 7 of the present disclosure at 85° C.

FIG. 10 shows the $CO_2$ adsorption capacities and amine utilization efficiencies of the materials prepared in Examples 1, 2, 5, 6, and 7 at 85° C. It can be seen from this figure that the 50% TEPA-NC and the 50% TEPA-ONC have relatively-high $CO_2$ adsorption capacities and amine utilization efficiencies. However, mesoporous carbon loaded with other amines all have a lower $CO_2$ adsorption capacity and amine utilization efficiency than these two materials, indicating that TEPA is the most suitable amine to be loaded on a mesoporous carbon material. The PEI-supported mesoporous carbon material has much better performance than the NC and ONC in FIG. 8, but has a lower adsorption capacity and amine utilization efficiency than the other materials, which is mainly caused by the large loss of amine sites due to the easy agglomeration of amine molecules of the polymer.

(4) The materials prepared in Examples 1 and 2 each were subjected to a regeneration test at different temperatures as follows: spent amine-supported mesoporous carbon generated after adsorption was heated in a pure nitrogen environment to allow regeneration at 105° C. to 125° C. Test results were shown in FIG. 11 and FIG. 12.

Figure 11:
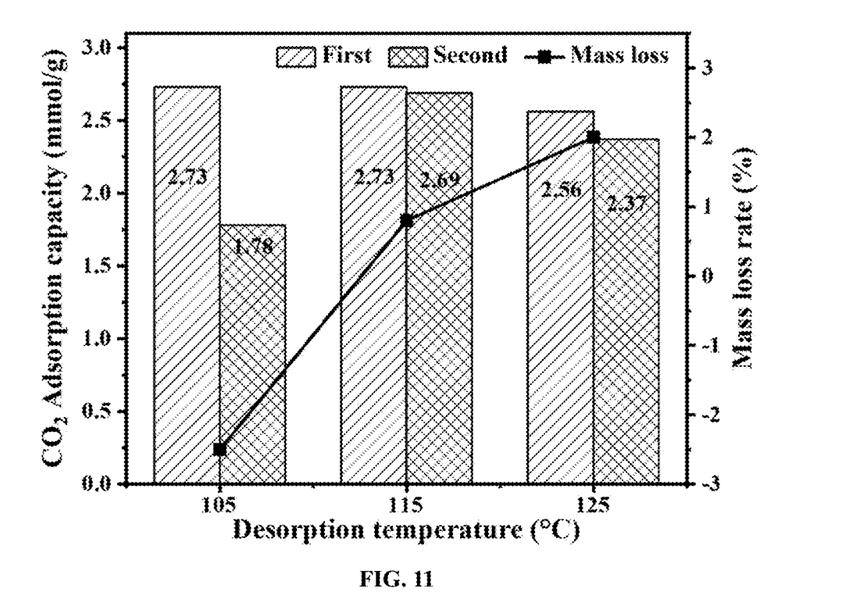
FIG. 11 is a comparison diagram of regeneration performance of Example 2 of the present disclosure at different desorption temperatures.

FIG. 11 shows the regeneration performance of Example 2 at different desorption temperatures, including two cyclic adsorption capacities and mass losses after adsorption and desorption. It can be seen from this figure that the regeneration of amine-supported mesoporous carbon can be achieved at 105° C. to 125° C. However, from the perspective of the two cyclic adsorption capacities and the mass losses, a cyclic adsorption capacity decreases particularly seriously due to the failed complete desorption of $CO_2$ at 105° C. A mass loss of the material after desorption at 125° C. is about 2%. Because the mass loss at this temperature is caused by an amine loss, the corresponding cyclic adsorption capacity also decreases greatly. However, after desorption at 115° C., the losses of both the cyclic adsorption capacity and the mass are relatively small. Therefore, 115° C. is the optimal desorption temperature for the amine-supported mesoporous carbon material.

Figure 12:
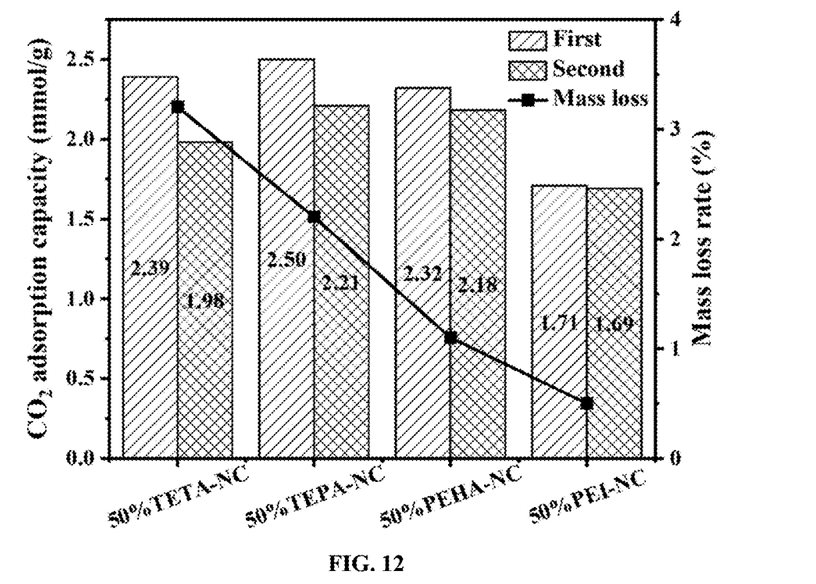
FIG. 12 is a comparison diagram of regeneration performance of the materials prepared in Examples 1, 5, 6, and 7 of the present disclosure during two cycles.

FIG. 12 shows the regeneration performance of the materials prepared in Examples 1, 5, 6, and 7 during two cycles. It can be seen from this figure that an adsorption capacity of the 50% TETA-NC during the second cycle decreases by 17.2% compared with an adsorption capacity of the 50% TETA-NC during the first cycle. There is a difference of only 1.2% between adsorption capacities of the PEI-supported mesoporous carbon during the first (1.71 mmol/g) and second (1.69 mmol/g) cycles, indicating excellent cycling performance. Mass losses of TETA, TEPA, PEHA, and PEI-supported mesoporous carbon are 3.2%, 2.2%, 1.2%, and 0.5%, respectively, indicating the same trend as the cycling performance. That is, as a relative molecular mass of an amine molecule increases, a mass loss of the loaded amine decreases. This is mainly attributed to the following fact: for these amines, with the increase of a relative molecular mass, a boiling point continuously increases and an amine loss at a same desorption temperature decreases.

Figure 13:
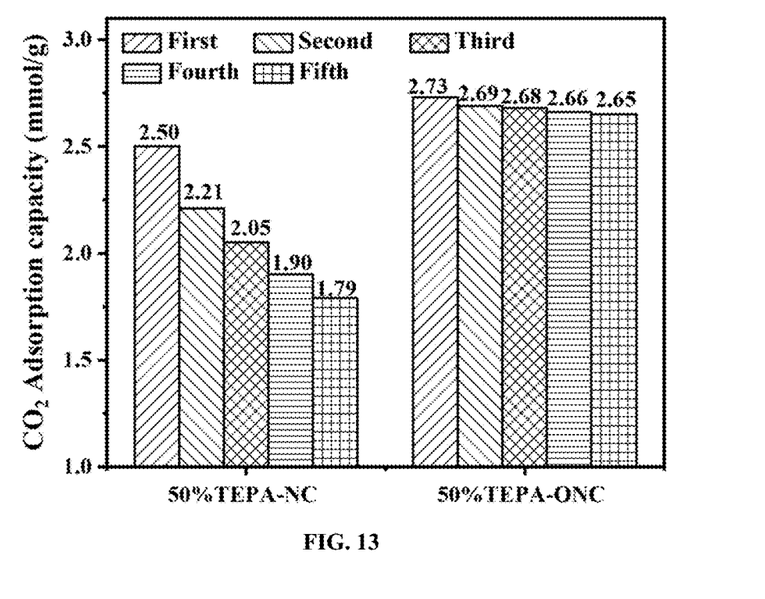
FIG. 13 is a comparison diagram of regeneration performance of the materials prepared in Examples 1 and 2 of the present disclosure during five cycles.

FIG. 13 shows the regeneration performance of the materials prepared in Examples 1 and 2 during five cycles. It can be seen from this figure that 50% TEPA-ONC exhibits significantly-better cyclic adsorption performance than 50% TEPA-NC, and a $CO_2$ adsorption capacity decreases by only 2.9% after five adsorption-desorption cycles, indicating excellent regeneration performance.

All documents mentioned in the present disclosure are cited as references in the present application, as if each document was individually cited as a reference. In addition, various changes or modifications may be made to the present disclosure by those skilled in the art after reading the above teaching content of the present disclosure, and these equivalent forms also fall within the scope defined by the appended claims of the present disclosure.

What is claimed is:

1. A method of preparing amine-supported mesoporous carbon for $CO_2$ adsorption, comprising the following steps:
    S1, dissolving glucosamine hydrochloride completely in deionized water to obtain a solution;
    S2, adding aqueous colloidal silica dropwise to the solution obtained in the S1 under stirring, and allowing full dispersion to obtain a first mixed solution; and heating and stirring the first mixed solution, and conducting evaporation to dryness to obtain a brown solid;
    S3, grinding the brown solid into a powder, adding the powder to a crucible, placing the crucible in a hydrothermal reactor, and conducting a hydrothermal reaction;
    S4, oven-drying a black powder produced after the hydrothermal reaction, and conducting carbonization in a muffle furnace in a protective gas environment to obtain a carbonized solid;
    S5, adding the carbonized solid obtained in the S4 to an ammonium hydrogen fluoride solution, and continuously stirring to remove silica; and repeatedly washing with deionized water until a resulting washing solution is neutral, and drying in an oven to obtain nitrogen-doped mesoporous carbon (NC);
    S6, adding the NC obtained in the S5 to an amine solution prepared with absolute ethanol, and continuously stirring to allow full dispersion to obtain a second mixed solution; and
    S7, stirring the second mixed solution in an oil bath until the absolute ethanol is completely evaporated to obtain the amine-supported mesoporous carbon,
    wherein an amine in the S6 is tetraethylenepentamine (TEPA), and an amine load is 50%; and
    before the S6, the NC obtained in the S5 is pre-oxidized as follows: stirring in nitric acid with a concentration of 8 mol/L to 12 mol/L at room temperature for 10 h to 20 h, conducting washing and suction filtration until neutral, and oven-drying.

2. The method according to claim 1, wherein the hydrothermal reaction in the S3 is conducted at 150° C. to 200° C. for 20 h to 30 h.

3. The method according to claim 1, wherein the protective gas environment in the S4 is as follows: a protective gas is nitrogen, a flow rate is 80 mL/min to 120 mL/min, and a heating rate is 8° C./min to 15° C./min.

4. The method according to claim 1, wherein the carbonization in the S4 is conducted under the following conditions: a temperature of 800° C. to 1,200° C., and a heat preservation time of 45 min to 90 min.

5. The method according to claim 1, wherein a concentration of the ammonium hydrogen fluoride solution in the S5 is 0.2 g/mL to 0.5 g/mL.

6. A use of the amine-supported mesoporous carbon for $CO_2$ adsorption prepared according to claim 1, comprising: introducing a feed gas comprising a $CO_2$ gas into a fixed bed carrying the amine-supported mesoporous carbon, and conducting adsorption at 60° C. to 90° C.

7. The use according to claim 6, further comprising the following regeneration treatment: heating spent amine-supported mesoporous carbon generated after the adsorption in a pure nitrogen environment for regeneration, wherein the regeneration is conducted at 105° C. to 125° C.

\* \* \* \* \*